US007003171B1

(12) United States Patent
Takeo

(10) Patent No.: US 7,003,171 B1
(45) Date of Patent: Feb. 21, 2006

(54) METHOD, APPARATUS AND RECORDING MEDIUM FOR DATA COMPRESSION

(75) Inventor: Hideya Takeo, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 816 days.

(21) Appl. No.: 09/356,505

(22) Filed: Jul. 19, 1999

(30) Foreign Application Priority Data

Jul. 17, 1998 (JP) ............................. 10-202501
Dec. 9, 1998 (JP) ............................. 10-350159

(51) Int. Cl.
*G06K 9/36* (2006.01)
(52) U.S. Cl. ........................... 382/251; 382/232
(58) Field of Classification Search ......... 382/232–253
See application file for complete search history.

(56) References Cited

PUBLICATIONS

IEEE Transactions of Image Processing, vol. 4, Jun. 1995, pp. 725-733, "Image Coding Using Wavelet Transforms and Entropy-Constrained Trellis-Coded Quantization".

IEEE Transactions on Circuits and Systems for Video Technology, vol. 6, Jun. 1996, pp. 243-250, "A New Fast and Efficient Image Codec Based on Set Partitioning in Hierarchical Trees".

Nikkan Kogyo Shimbun Co., May 25, 1981, "Digital Image Signal Processing", Fukinuke, T.

Shokodo Co., Feb. 25, 1992, "Digital Communication Systems", Kasahara et al.

*Primary Examiner*—Samir Ahmed
*Assistant Examiner*—Anand Bhatnagar
(74) *Attorney, Agent, or Firm*—Sughrue Mion, PLLC

(57) ABSTRACT

Fast and efficient data compression can be carried out. Original image data are subjected to wavelet transform. The obtained wavelet-transformed data are classified and bit allocation is determined. Based on the determined bit allocation, the wavelet-transformed data are quantized and quantized data are obtained. The quantized data are classified into 0 data and non-zero data. Binary classification information data indicating this classification are also obtained. The classification information data are coded according to a coding method having a comparatively simple operation, such as Huffman coding and run length coding. The multi-valued, non-zero data are coded according to a coding method having a high compression efficiency although having a comparatively complex operation, such as universal coding and Golomb-Rice coding.

30 Claims, 10 Drawing Sheets

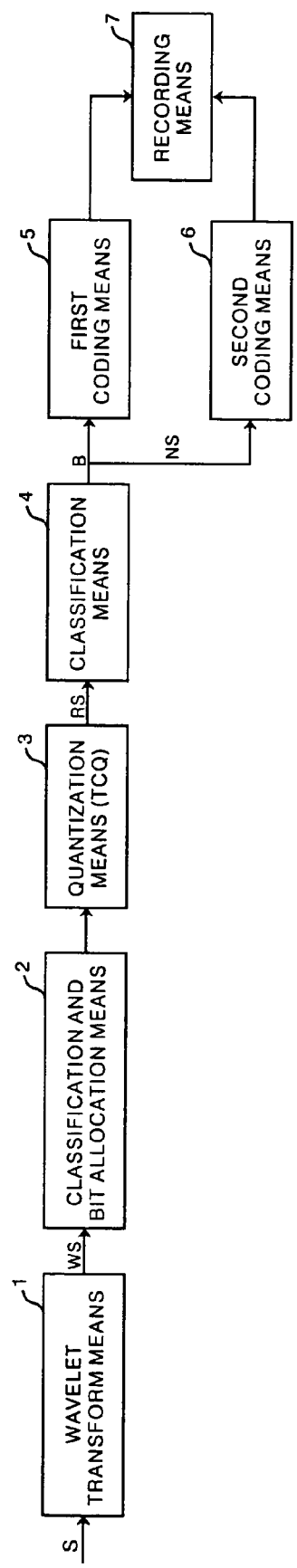

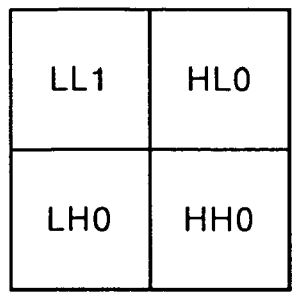 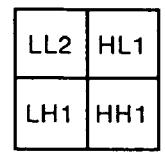 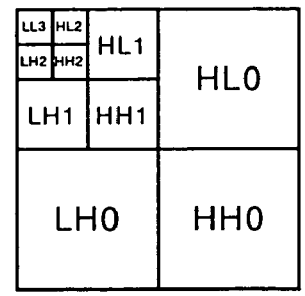
FIG.2a  FIG.2b  FIG.2c
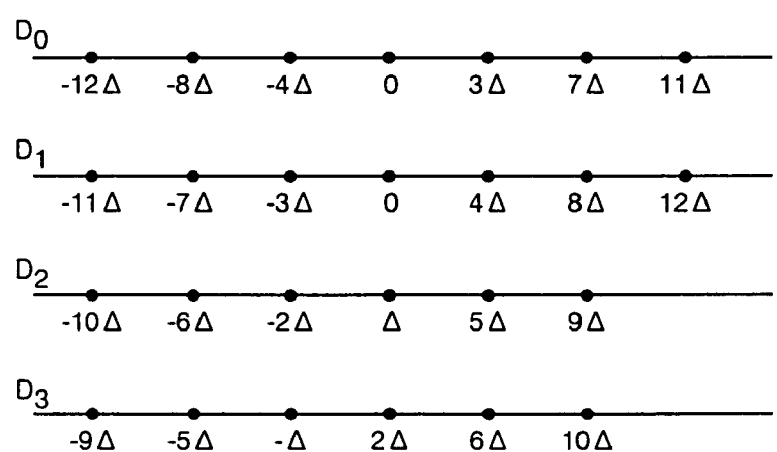
FIG.3

METHOD, APPARATUS AND RECORDING MEDIUM FOR DATA COMPRESSION

BACKGROUND OF THE INVENTION

1. Field of the Invention

The present invention relates to a method and an apparatus for compressing original data by coding thereof, and to a computer-readable recording medium storing a program for causing a computer to execute the data compression method.

2. Description of the Related Art

In the field of data compression such as image data compression by an image server in a medical network and compression of general data such as for communication and filing, various compression algorithms have been proposed. For example, as substantially efficient compression algorithms, the WTCQ method (P. Sriram and M. W. Marcellin, "Image coding using wavelet transforms and entropy-constrained trellis-coded quantization", IEEE Transactions on Image Processing, vol. 4, pp. 725–733, June 1995) and the SPIHT method (A. Said and W. A. Pearlman, "A new Fast and Efficient Image Codec Based on Set Partitioning in Hierarchical Trees", IEEE Transactions on Circuits and Systems for Video Tech., vol. 6. pp. 243–250, June 1996) have been proposed. FIG. 11 is a diagram explaining a compression algorithm according to the WTCQ method and the SPIHT method. Original image data S representing an original image are wavelet-transformed first. Data in each subband after the transform are classified while bit allocation is determined. Based on the determined bit allocation, quantization according to a TCQ method is carried out to obtain quantized data RS. Coded data are obtained by carrying out entropy coding on the quantized data RS. As the method for the entropy coding, in the WTCQ method, bit-plane binary arithmetic coding is used. In the bit-plane binary arithmetic coding, quantized data are decomposed into a plurality of bit planes, and converted into binary data. Binary arithmetic coding is carried out on the data in each bit plane and each output is coded. Meanwhile, in the SPIHT method, multi-valued arithmetic coding is used as the entropy coding. By compressing the original image data S in this manner, efficient coding with a substantially low bit rate can be carried out.

In the field of general JPEG compression, as shown in FIG. 12, an arithmetic coding method or a baseline method can be used. In the case of JPEG compression, discrete cosine transform (DCT) is carried out on the original image data S and quantization is carried out by determining bit allocation. In the case of arithmetic coding, after the quantized data RS have been converted from multi-valued data to binary data, binary arithmetic coding is carried out to obtain coded data. Meanwhile, in the case of the baseline method, the quantized data RS are coded using Huffman coding.

In the above-described SPIHT method, since multi-valued arithmetic coding is carried out, compression efficiency thereof is higher than that of the conventional Huffman coding or the like. However, computation therefor is time-consuming, since the multi-valued arithmetic coding is a substantially complex operation. Meanwhile, in the WTCQ method, since binary arithmetic coding is carried out, computation is carried out faster than in the SPIHT method. However, upon entropy coding, quantized data are decomposed into a plurality of bit planes (practically, approximately 14) and binary-coded, and it is necessary to carry out binary arithmetic coding thereafter on each bit plane. Therefore, as for the WTCQ method, a computational load becomes heavy as a whole, and the execution time is long.

In the arithmetic coding method in the above-described JPEG compression, data are binary coded as in the WTCQ method. Therefore, a computational load is heavy and the execution time is long. The baseline method uses Huffman coding, and the compression efficiency is thus lower than the WTCQ method or the like.

SUMMARY OF THE INVENTION

The present invention has been created based on consideration of the above problems. An object of the present invention is to provide a method and an apparatus for efficient and fast data compression, and a computer-readable recording medium storing a program to cause a computer to execute the data compression method.

A data compression method of the present invention is a data compression method of obtaining compressed coded data by quantization of original data to obtain quantized data followed by coding and compression of the quantized data. The data compression method of the present invention comprises the steps of:

classifying the quantized data into data having a value representing the quantized data and at least one set of classified data representing a data value other than the representative value while obtaining classification information data regarding this classification;

coding the classification information data according to a first coding method; and obtaining the coded data by coding at least the classified data out of the classified data and the data having the representative value, according to a second coding method.

In the data compression method of the present invention, it is preferable for the second coding method to be different between the data having the representative value and each set of the classified data.

In the data compression method of the present invention, it is preferable for the quantized data to be obtained by carrying out wavelet transform on the original data followed by quantization thereof. It is also preferable for the quantized data to be obtained by carrying out DCT on the original data followed by quantization thereof.

In the case where the quantized data are obtained after wavelet transform, quantization and coding is carried out on wavelet-transformed data in each subband.

Furthermore, it is preferable for the data having the representative value to be 0 data representing the value 0 of the quantized data, and it is preferable for the classified data to be non-zero data representing non-zero values of the quantized data.

The "value representing the quantized data" herein referred to means various kinds of values such as an average of the data values, a mode in the quantized data, and the value 0. As a method of classifying the quantized data into the data having the representative value and the data other than those, various kinds of methods can be used. For example, the quantized data may be classified simply according to the representative value and non-representative values. Alternatively, the data may be classified into the data having the representative value and data having values smaller and larger than the representative value, or into the data having the representative and data having values whose absolute differences from the representative value are smaller and larger than a threshold value.

The "classification information data" have a value corresponding to the number of classification classes. For example, when the quantized data are classified into 2 classes, namely the data having the representative value and the data having values other than that, the classification information data are binary. When the quantized data are classified into the data having the representative value and data having the values below and above the representative value, the classification information data are 3-valued.

Furthermore, "at least the classified data are coded according to the second coding method", because the data having the representative value are not coded in some cases, as in the case where the representative value is 0.

The phrase stating that the coding method "is different between the data having the representative value and each set of the classified data" means the case where the data having the representative value and the classified data have different coding methods, as well as the case where each set of classified data has a different coding method when a plurality of classified data sets exist.

As the first coding method, any one of Huffman coding, run length coding, B1 coding, B2 coding, Wyle coding, Golomb coding, Golomb-Rice coding, and binary arithmetic coding can be adopted.

As the second coding method, any one of Huffman coding, universal coding, and multi-valued arithmetic coding can be used.

In the data compression method of the present invention, if the amount of the coded data is larger than a predetermined information amount determined based on the original data, it is preferable for the coded data to be obtained by coding the classified data according to a third coding method, out of the classification information data and/or the data having the representative value and the classified data.

It is preferable for the third coding method to be any one of Huffman coding, arithmetic coding, and PCM (Pulse Code Modulation) without any coding.

As the "predetermined information amount determined based on the original data", the amount of the original data may be used. It is preferable for the predetermined information amount to be an information amount smaller than the amount of the original data and enabling reduction in an information amount when at least the classified data out of the classification information data and/or the data having the representative value and the classified data are coded according to the third coding method.

A data compression apparatus of the present invention is a data compression apparatus for obtaining compressed coded data by quantization of original data to obtain quantized data followed by coding and compression of the quantized data. The data compression apparatus comprises:

classification means for classifying the quantized data into data having a representative value representing the quantized data and at least one set of classified data having a data value other than the representative value and for obtaining classification information data representing this classification;

first coding means for coding the classification information data by using a first coding method; and second coding means for coding at least the classified data according to a second coding method, out of the data having the representative value and the classified data.

It is preferable for the second coding method carried out by the second coding means to be different for the data having the representative value and each set of the classified data.

It is preferable for the data compression apparatus of the present invention to further comprise wavelet transform means for obtaining the quantized data by carrying out wavelet transform on the original data followed by quantization thereof, or DCT means for obtaining the quantized data by carrying out DCT on the original data followed by quantization thereof.

Furthermore, it is preferable for the classification means to classify the quantized data by letting the data having the representative value be 0 data representing the value of 0 of the quantized data and letting the classified data be non-zero data representing non-zero values of the quantized data.

Moreover, it is preferable for the data compression apparatus of the present invention to further comprise:

judging means for judging whether or not the amount of the coded data is larger than a predetermined information amount determined based on the original data; and third coding means for obtaining the coded data by coding at least the classified data according to a third compression method out of the classification information data and/or the data having the representative value and the classified data, in the case where the judging means has judged the amount of the coded data to be larger than the predetermined information amount.

The processing carried out in the above-described data compression method may be provided in the form of a computer-readable recording medium storing a program to cause a computer to execute the method.

According to the present invention, the quantized data obtained by quantization of the original data are classified into the data having the representative value, the classified data, and the classification information data showing a classification result according to the data values. The classification information data are data having a comparatively small information amount, such as binary data or 3-valued data, although the amount depends on the classification. Therefore, coding by a simple coding method can be carried out at a high compression rate and with a light computational load. The data having the representative value are data containing only one value. Therefore, coding can be carried out with a small amount of computation and at a comparatively high compression rate. The classified data other than the data having the representative value are multi-valued. However, since the representative value have been eliminated, the ratio of these data to the total quantized data is comparatively low. For example, in the case of 0.5 bit/pixel (1/20 compression of 10-bit data), if 0 is the representative value, the ratio of non-zero values is only about 13%. Therefore, the amount of data to be processed is small, although the data are multi-valued.

Consequently, in the present invention, although coding of multi-valued data is carried out, the computational load therefor is lighter than the conventional compression algorithm described above, and the data having the representative value and the classification information data can be compressed at a high compression rate with a light computational load. In this manner, the original data can be compressed fast and efficiently, at a high compression rate.

Furthermore, by classifying the quantized data into 0 data and non-zero data, classification becomes easy and compression of 0 data in the classified data is not necessary. Therefore, the original data can be compressed faster with a smaller computational load.

Moreover, since the classification information data have a comparatively small information amount, such as binary data and 3-valued data, the classification information data can be compressed fast and efficiently by any one of the Huffman coding, run length coding, B1/B2 coding, Wyle coding, Golomb coding, Golomb-Rice coding, and binary arithmetic coding, which are all comparatively simple operations.

The multi-valued data in the classified data occupies a small portion of the entire quantized data. Therefore, efficient coding can be carried out by using any one of the Huffman coding, universal coding, and multi-valued arithmetic coding which enable high compression rate coding although computation therefor is complex.

According to the present invention, the original data can be compressed at a high compression rate. For example, when the original data represents a background image with plain signal values, only either the data having the representative value or the classified data have information if the original data are quantized and classified into the data having the representative value and the classified data. Therefore, the amount of classification information data is large and the amount of the coded data may become larger than the amount of the original data. In a case like this, the information amount of the coded data is compared with the predetermined information amount determined based on the original data, and when the former is larger than the latter, at least the classified data are coded out of the classification information data and/or the data having the representative value and the classified data, according to the third coding method.

BRIEF DESCRIPTION OF THE DRAWINGS

FIG. 1 is a schematic block diagram showing a configuration of a data compression apparatus according to a first embodiment of the present invention;

FIGS. 2a, 2b and 2c are diagrams for explaining wavelet transform;

FIG. 3 is a diagram showing scalar quantizers;

DESCRIPTION OF THE PREFERRED EMBODIMENTS

Figure 4:
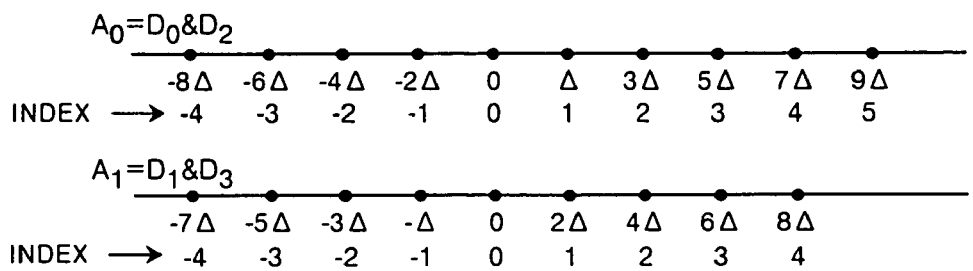
FIG. 4 is a diagram showing sum sets of 2 scalar quantizers.

Hereinafter, embodiments of the present invention will be explained with reference to the accompanying drawings.

FIG. 1 is a schematic block diagram showing a configuration of a data compression apparatus according to a first embodiment of the present invention. As shown in FIG. 1, the data compression apparatus according to the first embodiment comprises wavelet transform means 1 for obtaining wavelet-transformed data WS in each subband at each resolution by carrying out wavelet transform on original image data S, classification and bit allocation means 2 for classifying the wavelet-transformed data WS and for determining bit allocation for each class, quantization means 3 for obtaining quantized data RS by quantizing the wavelet-transformed data WS according to the bit allocation determined by the classification and bit allocation means 2, classification means 4 for obtaining 0 data S0, non-zero data NS and classification information data B representing a classification result through classification of the quantized data RS, first coding means 5 for coding the classification information B according to a first coding method, second coding means 6 for coding the non-zero data NS B according to a second coding method, and recording means 7 for recording coded data F resulting from the coding in a recording medium.

The wavelet transform means 1 carries out wavelet transform on the original image data S as follows. As shown in FIG. 2(a), the original image data S are subjected to wavelet transform and decomposed into 4 sets of data at a plurality of resolutions, namely LL1, HL0, LH0, and HH0. The data LL1 represents an image whose width and height are ½ of those of the original image, and the data HL0, LH0 and HH0 respectively represent images of a vertical edge component, a horizontal edge component, and a diagonal edge component. As shown in FIG. 2(b), 4 sets of data LL2, HL1, LH1 and HH1 are obtained through wavelet transform on the data LL1. The data LL2 represents an image whose width and height are ½ of those of the data LL1, and the data HL1, LH1 and HH1 represent images of vertical, horizontal and diagonal edge components of the data LL1 respectively. The wavelet transform is repeated a desired number of times on data LL obtained at each wavelet transform, and data at multiple resolutions are obtained thereby. When the wavelet transform is carried out 3 times, as shown in FIG. 2(c), data at 3 resolutions can be obtained. In this embodiment, data at each resolution, that is, data in each subband, are all called wavelet-transformed data WS.

The classification and bit allocation means 2 determines the classification and bit allocation of the wavelet-transformed data WS in the following manner. For example, the wavelet-transformed data WS in each subband obtained by carrying out wavelet transform as shown in FIG. 2(c) are classified into 4 classes, namely data LL2, data HHn (n=0~2), data HLn (n=0~2), and data LHn (n=0~2). This is because the data in each class have statistically similar signal values. For the data in each class, square error of the data values is calculated for example, and the bit allocation is determined based on the magnitude of the square error. For example, when the square error is large, a large number of bits are allocated for data saving. When the square error is small, a small number of bits are allocated, since missing data are allowed to some degree.

The quantization means 3 carries out quantization of the wavelet-transformed data WS according to a TCQ (Trellis Coded Quantization), based on the bit allocation determined by the classification and bit allocation means 2. The TCQ method is based on the TCM (Trellis Coded Modulation) developed in the field of signal communication and audio coding, and has been generated by extending this TCM method for image coding. The TCQ method can be considered theoretically to have the same meaning as infinite-length vector quantization. From the viewpoint of the rate-distortion theory, an S/N ratio can be improved by several dB's compared with conventional scalar quantization. The TCQ method is one of vector quantization methods. In the TCQ method, for a plurality of signal inputs (b1, b2, ... bn), the same number of quantized values (q1, q2, ... qn) are output. The quantized values are determined by using the Viterbi algorithm for searching for a path along which a total of quantization errors becomes minimal for the input vector. In this embodiment, the Viterbi algorithm is applied by letting a mean square of each quantization error be the cost of the path. In the TCQ method, sets of a plurality of quantization representative values are defined, and the quantization representative value sets are used properly depending on a state. For example, when the classification and bit allocation means 2 has allocated 4 bits and an index (which will be explained later in detail) after quantization is expressed by 4 bits or fewer, quantization can be carried out easily by normally using quantization representative values of 16 points. In the TCQ method, 2 sets of quantization representative values (for example, Q1 and Q2) for 16 points are used, and which set of the quantization representative values is used is defined depending on the state, such as Q1 for a state S0, and Q2 for a state S1. State transition rules which are common for both quantization and inverse quantization are defined in advance. Quantization progresses while the state transits every time quantization is carried out on one pixel. In this manner, by carrying out quantization processing, 32 quantization representative values (31 for the case where 0 is used twice) which is double the values in the normal case can be used apparently, and selection of the path for reducing the quantization error is widened. Hereinafter, the TCQ quantization method will be explained more specifically.

Figure 5:
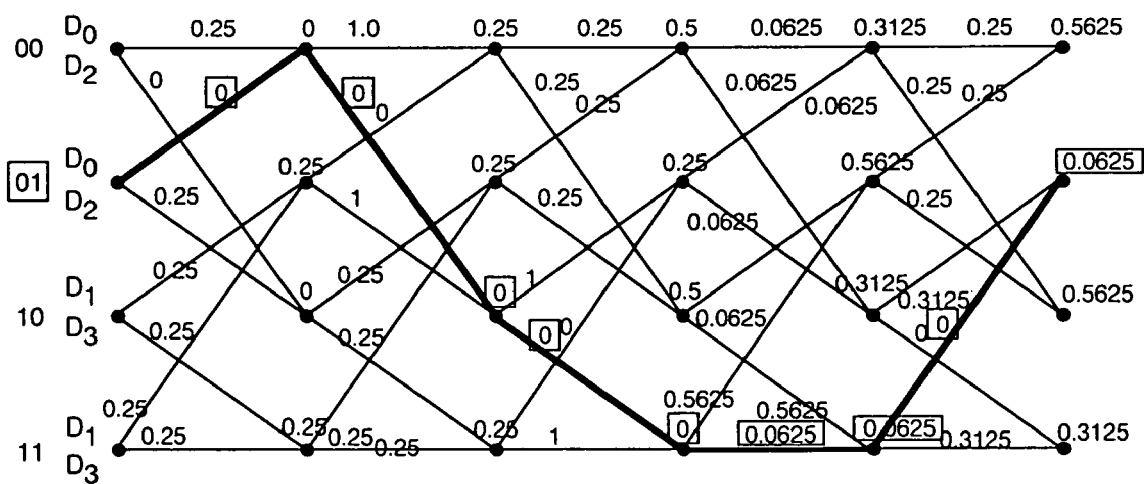
FIG. 5 is a 4-state trellis diagram.

FIG. 3 shows 4 scalar quantizers D0 to D3, and FIG. 4 shows sum-sets (sum-set quantizer) of 2 scalar quantizers. FIG. 5 shows a 4-state trellis diagram. In FIG. 3, $\Delta$ is a quantization step size determined by the quantization bit allocation, and assumed to be 0.5 in this embodiment. In FIG. 4, a sum-set quantizer D0&D2 (=A0) of scalar quantizers D0 and D2, and a sum-set quantizer D1&D3 (=A1) for scalar quantizers D1 and D3 are shown. In this embodiment, a signal comprising 5 elements as input wavelet-transformed data WS is used and the 5 elements are expressed as WS=(0.5, −3, −3, 0.25, −2.5). FIG. 5 shows, as state transitions, how an optimal quantizer is selected when the signal having the 5 elements is quantized at one time. The transition states are shown by the selected quantizers. In other words, the state wherein the sum-set quantizer D0&D2 has been selected is shown as "state D0&D2". The method of quantization will be explained below.

The quantization method according the TCQ method examines all paths of the trellis diagram defined as shown in FIG. 5, and finds out the path along which mean square errors (hereinafter called MSE) of all elements of the input signal after quantization become minimal. More specifically, when 0.5, which is the first element of the wavelet-transformed data WS, is quantized by the quantizer D2 out of the quantizers D0 to D3, MSE becomes $(0.5-\Delta)^2=0.0$ which is a minimum. For the next element −3, if quantization is carried out by the quantizer D2, MSE becomes $(-3-(-6\Delta))^2=0.0$ which is also a minimum.

Meanwhile, as restraints of trellis transition, paths are limited in a manner such that for the sum-set quantizer D0&D2, a subsequent quantizer is D0 (the state shifts to D0&D2), or D2 (the state shifts to D1&D3). For the sum-set quantizer D2&D0, a subsequent quantizer is D2 (the state shifts to D0&D2), or D0 (the state shifts to D1&D3). For the sum-set quantizer D1&D3, a subsequent quantizer is D1 (the state shifts to D2&D0), or D3 (the state shifts to D3&D1).

For the sum-set quantizer D3&D1, a subsequent quantizer is D3 (the state shifts to D2&D0) or D1 (the state shifts to D3&D1). These restraints have been pre-set and for the sum-set quantizer D0&D2, the subsequent quantizer D0 corresponds to the state D0&D2, while D2 corresponds to the state D1&D3. For the sum-set quantizer D2&D0, the subsequent quantizer D2 corresponds to the state D0&D2, while D0 corresponds to D1&D3. For the sum-set quantizer D1&D3, the subsequent quantizer D1 corresponds to D2&D0 while D3 corresponds to D3&D1. For the sum-set quantizer D3&D1, the subsequent quantizer D3 corresponds to the state D2&D0, while D1 corresponds to the state D3&D1.

A restraint length of the trellis transition branches in the trellis diagram corresponds to the number of elements of the signal (in this embodiment, the restraint length is 5, since the number of the elements is 5), and MSE is calculated as the cost in all combinations of the trellis transitions. The path along which the sum of the cost becomes minimal is selected, and the quantizers are selected by the path to carry out quantization. The cost is basically calculated for all paths. However, when the cumulative cost of a path being calculated exceeds the minimum cost of another path having been calculated, the cost calculation is interrupted and the cost of a subsequent path is then calculated, for example. In this manner, an operation speed is increased. In FIG. 5, the cost at all paths are shown. Along the path having the minimum cost (indicated by a thick line in FIG. 5), the quantizer D2&D0 (=A0) has been selected in the initial state, and D2 (the state D0&D2=A0), D2 (the state D1&D3=A1), D3 (the state D3&D1=A1), D1 (the state D3&D1=A1), and D3 (the state D2&D0=A0) have been selected in this order and the signal is quantized as WS'= (0.5, −3, 3, 0, −2.5). For the elements 0.5, −3, 3, and −2.5 in the signal WS, MSE=0. However, for the element 0.25, the MSE becomes 0.0625 which is a minimum when the quantizer D1 is selected. Therefore, the cost at this time becomes $$(0.5-\Delta)^2+(-3-(-6\Delta))^2+(3-6\Delta)^2+(0.25-0)^2+(-2.5-(-5\Delta))^2=0.0625$$

The index of the quantizers is defined as shown in FIG. 4. In this embodiment, the index is output instead of the quantized values. Furthermore, the sum-set quantizer D0&D2 is coded as 00 in 2 bits, while D2&D0, D1&D3, D3&D1 are coded into 01, 10, and 11. Therefore, the quantized data RS (1, −3, 3, 0, −3) and the code 01 representing the initial state are found at this time by correlating WS'=(0.5, −3, 3, 0, −2.5) and the index of the quantizers shown in FIG. 4. In the case of 8-state trellis diagram, the information indicating the initial state is expressed by 3 bits.

An inverse quantization method in TCQ method will be explained next. The inverse quantization is carried out on the elements, staring from the first value of the index. As has been described above, when the index is (1, −3, 3, 0, −3), since the first value of the index is 1, the first value of the element can be estimated as $\Delta(=0.5)$ or $-\Delta(=-0.5)$, by comparing the 2 sum-set quantizers A0 and A1 shown in FIG. 4. However, since the initial state shows 01, that is, the state D2&D0 (=A0), the quantizer D2 is selected according to the trellis transition rule shown in FIG. 5. Therefore, A of the quantizer D2, that is, 0.5 is obtained. The transition state then shifts to D2 (D0&D2=A0). Likewise, since the next value of the index is −3, the element corresponding to this index can be estimated as $-6\Delta(=-3)$ or $-5\Delta(=-2.5)$ by comparing the 2 sum-set quantizers A0 and A1. According to the trellis transition rule, the quantizer D2 is selected, and the value −6Δ of the quantizer D2, that is, −3 is found. The transition state then shifts to D2 (D1&D3=A1).

Likewise, since the next value of the index is 3, the element corresponding to this can be estimated as 5Δ(=2.5) or 6Δ(=3) by comparing the 2 sum-set quantizers A0 and A1. According to the trellis transition rule, the quantizer D3 is selected, and the value 6Δ of the quantizer D3, that is, 3 is found. The transition state then shifts to D3 (D3&D1=A1). Since the next value of the index is 0, the element corresponding to this can be estimated as 0 by comparing the 2 sum-set quantizers A0 and A1. According to the trellis transition rule, the quantizer D1 is selected, and the value 0 of the quantizer D1 is found. The transition state then shifts to D1 (D3&D1= A1). Since the next value of the index is −3, the element corresponding to this can be estimated as −6Δ(=−3) or −5Δ(=−2.5) by comparing the 2 sum-set quantizers A0 and A1. According to the trellis transition rule, the quantizer D3 is selected, and the value −5Δ of the quantizer D3, that is, −2.5 is found. In this manner, the signal (0.5, −3, 3, 0, −2.5) is restored.

As has been described above, by defining trellis transition and by selecting the optimal scalar quantizer according to the rule, quantization can be carried out. For details of the TCQ method, see the reference by P. Sriram and others.

The classification means 4 classifies the quantized data RS according to their data values. At this time, the quantized data RS are classified into the data having the representative value and data having values other than that. For example, in this embodiment, 0 is the representative value for the quantized data RS, and the quantized data RS are classified into 2 classes, namely 0 data S0 and non-zero data NS. If quantization is carried out after the wavelet transform on the original image data S, the ratio of 0-values to the quantized data RS becomes substantially large. For example, if 0.5 bit/pixel compression (10-bit original image data S are compressed to 1/20) is carried out, the rate of the non-zero data NS to the entire data is approximately 13%. In this manner, the quantized data RS are classified into the 0 data S0, the non-zero data NS, and the classification information data B representing information regarding this classification. The classification information data B is binary data representing the result of classification of the quantized data into the 0 data and the non-zero data.

The first coding means 5 is for coding the classification information data B and any one of the Huffman coding, run length coding, B1 coding, B2 coding, Wyle coding, Golomb coding, Golomb-Rice coding, and binary arithmetic coding, all of which are comparatively simple operations, is adopted as the coding method.

Huffman coding is widely known as a method of generating instantaneously decodable compact code. In the Huffman coding, when a probability distribution of information source alphabets is provided, instantaneously decodable compact code can always be obtained by using a simple algorithm. Therefore, this is a extremely effective coding algorithm.

The run length coding is a coding method wherein length of symbols "0" and "1" are coded or a specific pattern considering an interval of appearance probability of "0" and "1" is coded when the symbol "0" in binary information has a higher probability which is close to 1 or when long runs of "0" or "1" appear alternately.

B1 and B2 coding is one of the run length coding methods and the detail thereof is described in "T. Fukinuke, Digital Image Signal Processing (in Japanese), Nikkan Kogyo Shinbun Co, May 25, 1981".

Wyle coding is one of the run length coding methods. Wyle coding has been proposed based on a principle that an average code length is shortened by measuring a probability distribution of a run of each symbol represented by a sequence of "0" and "1" and then by assigning a short code for a run having a high probability and a long code for a run having a low probability.

Golomb coding has been known as code of an efficient entropy coding for a geometric distribution information source. The code cannot necessarily be a compact code. This method is called Golomb-Rice method when the degree is a power of 2, and coding and decoding by a simple configuration becomes possible.

The arithmetic coding uses uniquely decodable compact code. This coding method has extreme generality including the Huffman coding. Coding and decoding can be executed by carrying out arithmetic operations, and a symbol in a information source symbol sequence is coded by executing an algorithm. The arithmetic coding can be considered as a process of sequentially dividing a unit interval (0, 1) into partial intervals satisfying the following 2 conditions:

(1) Each code word is a sum of appearance probability (cumulative probability) of proceeding information source symbol.

(2) The width of a partial interval in the right of each code word is the probability of the symbol.

The binary arithmetic coding is appropriate for binary data.

The above-described run length coding, B1 coding, B2 coding, Wyle coding, Golomb coding, Golomb-Rice coding, and binary arithmetic coding are appropriate for coding binary data.

The second coding means 6 is for coding the non-zero data NS. As a method used here, any one of the Huffman coding, universal coding, and multi-valued arithmetic coding can be used. These coding methods are efficient, that is, they enable data coding at a high compression rate, although the operation therefor is complex.

The universal coding is a block coding method asymptotically optimal for an information source whose parameter is unknown. The universal coding satisfies the following 2 conditions:

(1) Coding is carried out depending only on a statistic amount of a measured information source message block, not depending on a past or future block. In other words, coding is carried out memorylessly on each block.

(2) As the block becomes longer indefinitely, a characteristic of optimal code represented by various measures is achieved to an arbitrary approximation degree.

As the universal coding, Lynch-Davission coding, Lawrence coding, and the like are well-known.

In the arithmetic coding described above, the multi-valued arithmetic coding is appropriate for multi-valued data.

The above-described coding methods carried out by the first and second coding means 5 and 6 are described in detail in "Kasahara et al, Digital Communication Systems (in Japanese), Shokodo Co, Feb. 25, 1992".

Figure 6:
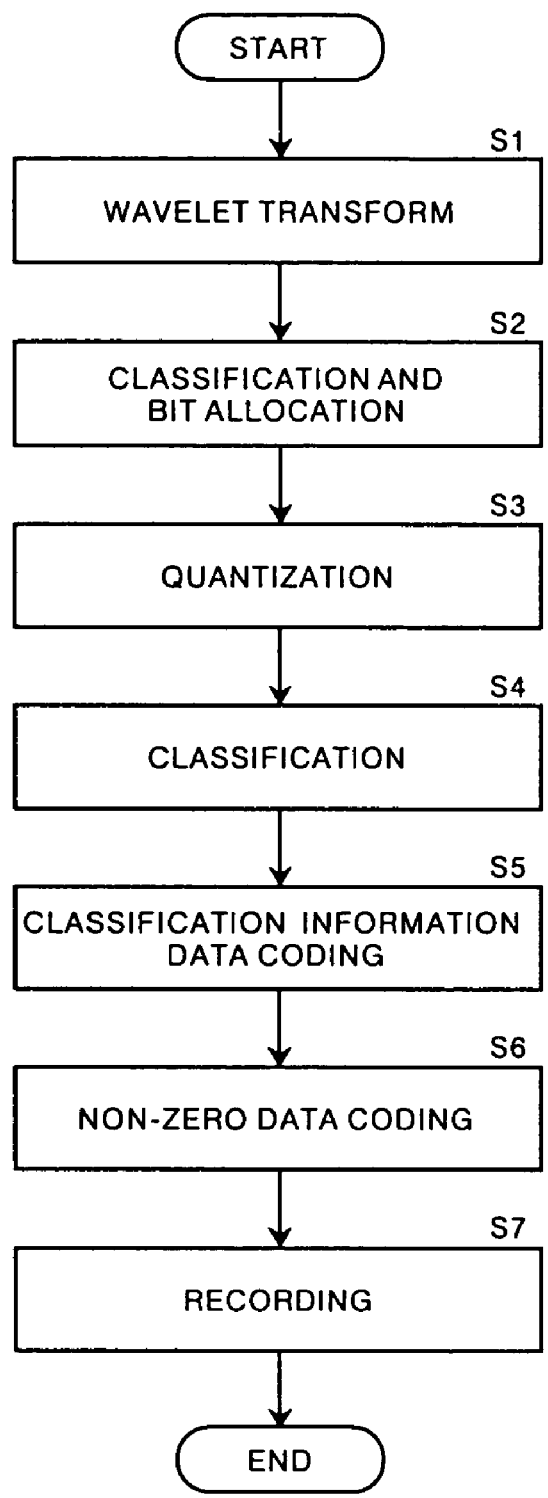
FIG. 6 is a flow chart showing processing carried out by the first embodiment.

An operation of the first embodiment will be described next. FIG. 6 is a flow chart showing processing carried out by the data compression apparatus according to the first embodiment.

The wavelet transform means 1 carries out wavelet transform on the original image data S to obtain the wavelet-transformed data WS, as has been described above (step S1). The classification and bit allocation means 2 then classifies the wavelet-transformed data WS and determines the bit allocation of each class (step S2). The quantization means 3 quantizes the wavelet-transformed data WS in each class based on the determined bit allocation. The quantized data RS are obtained in this manner (step S3). The quantized data RS are classified into the 0 data S0 and the non-zero data NS by the classification means 4, and the classification information data B indicating classification of the 0 and non-zero data are obtained (step S4).

The classification information data B are coded by the first coding means 5 according to any one of the above-described Huffman coding, run length coding, B1 coding, B2 coding, Wyle coding, Golomb coding, Golomb-Rice coding, and binary arithmetic coding (step S5). Meanwhile, the non-zero data NS are coded by the second coding means 6 according to any one of the above-described Huffman coding, universal coding, and multi-valued arithmetic coding (step S6). The processing at the steps S5 and S6 may be exchanged, or carried out in parallel. The coded classification information data B and the non-zero data NS are recorded as coded data F in a recording medium by the recording means 7 (step S7), and the processing ends.

In order to decode the coded data F, processing which is a reversal of the flow chart shown in FIG. 6 is carried out. In other words, the classification information data B and the non-zero data NS are obtained by decoding the coded classification information data B and the non-zero value data NS both included in the coded data F, according to decoding methods corresponding to the coding methods. The quantized data RS are obtained by finding the 0 data S0 based on the classification information B and the non-zero data NS. The quantized data RS are inversely quantized and the wavelet-transformed data WS are obtained. By carrying out inverse wavelet transform on the wavelet-transformed data WS, the original image data S are finally obtained.

The classification information data B obtained in the first embodiment are binary data, and have a comparatively small data size. Therefore, coding having a light computational load and at a high compression rate can be carried out by the first coding means 5 employing the simple coding method. The 0 data S0 inherently have no information. Therefore, decoding can be carried out without coding the 0 data if only the classification information regarding the classification of the 0 data and the non-zero data is available. Furthermore, although the non-zero data NS are multi-valued, the rate thereof to the total quantized data RS is only approximately 13%. Therefore, a computational load can be reduced even when the coding method having high efficiency but computational complexity is employed by the second coding means 6.

Therefore, in this embodiment, although the coding of the multi-valued non-zero data NS is carried out, the computational load is comparatively lighter than the conventional compression algorithm described above, and the classification information data B can be compressed at a high compression rate, with a small computational load. In this manner, the original image data S can be compressed fast and at a high compression rate.

In this embodiment, since the quantized data RS are classified into the 0 data S0 and the non-zero data NS, classification thereof is easy. Furthermore, compression of the 0 data S0 is not necessary, which leads to a lighter computational load and fast compression of the original image data S.

The compression efficiency and the operation load therefor are almost the same between the case where the original image data S are compressed to 1/20 according to the conventional WTCQ method and the case where the original image data S are compressed to 1/17 by the coding method in this embodiment. Therefore, a degree of performance degradation of the coding method in this embodiment compared with the WTCQ method is comparatively low. This has been confirmed through an experiment carried out by the applicant of the present invention.

Figure 7:
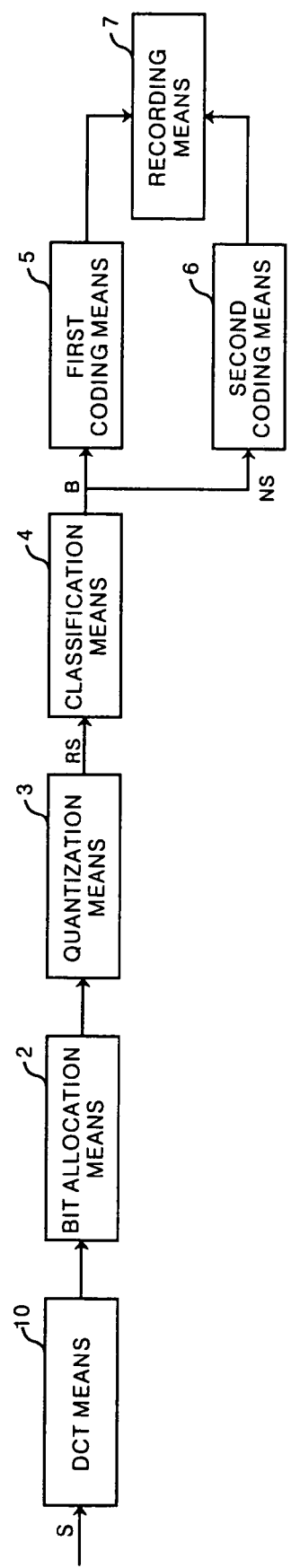
FIG. 7 is a schematic block diagram showing a configuration of a data compression apparatus according to a second embodiment of the present invention.

A second embodiment of the present invention will be explained next. FIG. 7 shows a schematic block diagram of a configuration of a data compression apparatus according to the second embodiment of the present invention. In the second embodiment, the data compression apparatus comprises DCT means 10 for transforming the original image data S according to discrete cosine transform (DCT), not according to the wavelet transform, and the data classification in the case of the wavelet transform is not carried out. In the second embodiment, DCT, bit allocation, and quantization are a quantization method standardized according to the JPEG format.

By applying the present invention to the method standardized according to the JPEG format as in the above, the original image data S can be coded fast and efficiently, as in the first embodiment.

According to the above first and the second embodiments, the original image data S can be compressed at a high compression rate. However, in the case where the original image data S represents a background image having a plain signal value and the original image data S are classified into the 0 data S0 and the non-zero data NS after quantization of the original data for example, the coded data F may have a larger amount of information than the original image data S, since the amount of the classification information B is large due to the quantized data having been classified into the non-zero data NS only. An embodiment to solve this problem will be explained next as a third embodiment.

Figure 8:
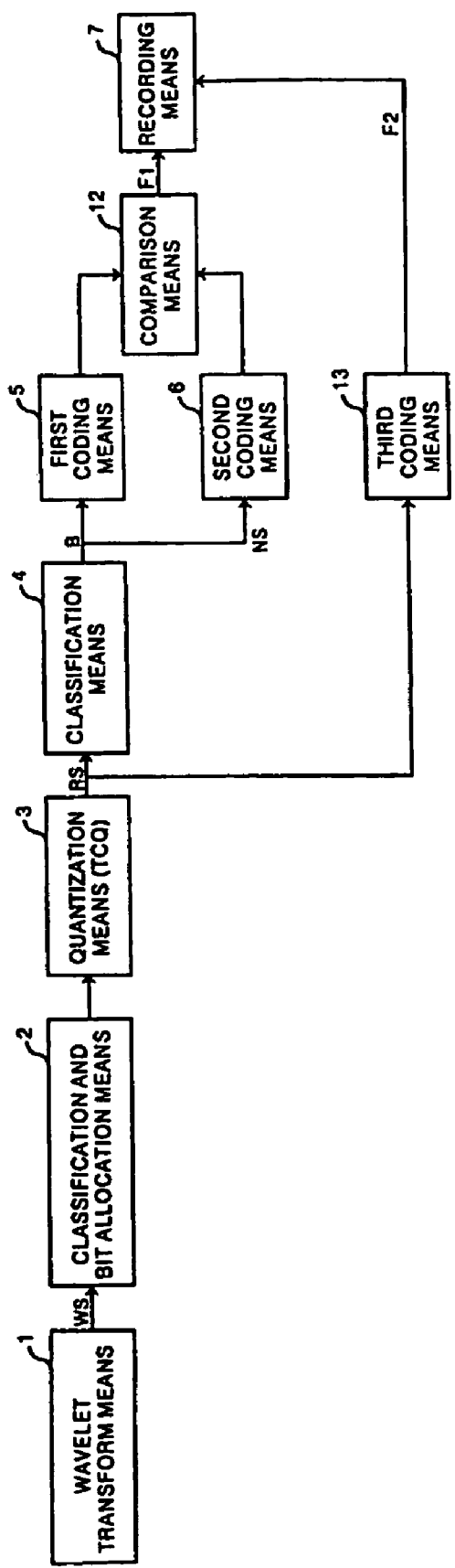
FIG. 8 is a schematic block diagram showing a configuration of a data compression apparatus according to a third embodiment of the present invention.

FIG. 8 is a schematic block diagram showing a configuration of a data compression apparatus according to the third embodiment of the present invention. In the third embodiment, the same reference numerals as in the first embodiment are used and detailed explanation thereof will be omitted. In the third embodiment, the data compression apparatus comprises comparison means 12 for comparing the information amount between coded data F1 in each subband in the coded data F obtained by the first embodiment and the wavelet-transformed data WS, and third coding means for obtaining coded data F2 by coding the quantized data RS according to a third coding method when the information amount of the coded data F1 in each subband has been judged by the comparison means 12 to be larger than that of the wavelet-transformed data WS.

The comparison means 12 compares the information amount between the coded data F1 in each subband and the wavelet-transformed data WS. In the case of the above-described TCQ method, since the original number of bits is 16 for example, the amount of the wavelet-transformed data WS is the length of the signal sequence in the quantized data RS×16 bits. When the information amount of the coded data F1 is larger than that of the wavelet-transformed data WS, the third coding means 13 carries out coding on the quantized data RS according to the third coding method and obtains the coded data F2. When the coded data F1 have smaller amount of data than the wavelet-trans formed data WS, the coded data F1 are input to the recording means 7 as the coded data F.

As the coding method employed by the third coding means 13, a method which enables efficient data coding at a high compression rate, such as Huffman coding and multi-valued arithmetic coding, can be used, although the operation therefor is complex. However, the PCM method which carries out no coding may be adopted. The coding method used by the third coding means is also described in the above-cited reference by Kasahara et al.

Figure 9:
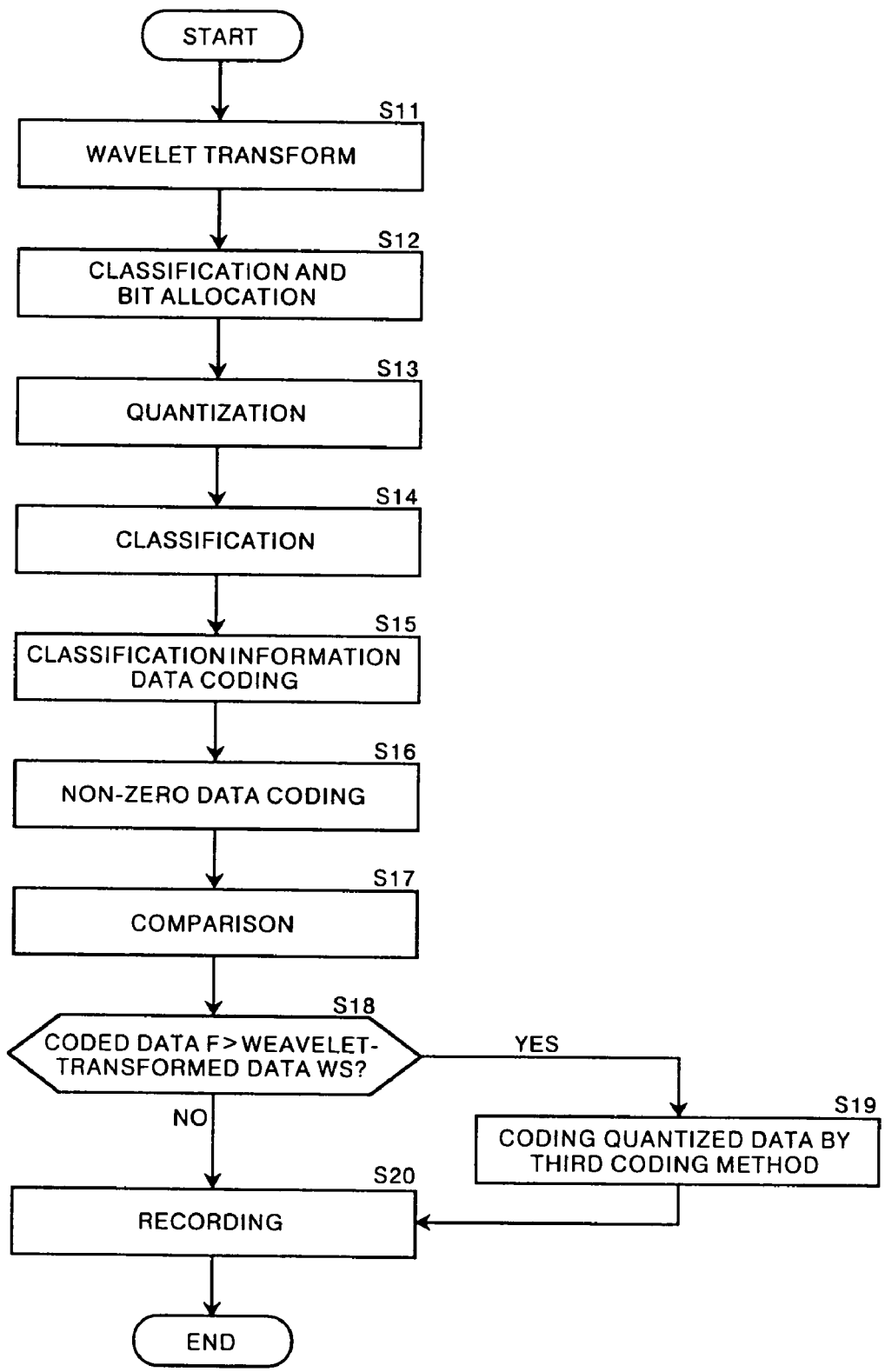
FIG. 9 is a flow chart showing processing carried out by data compression apparatus according to the third embodiment.

An operation of the third embodiment will be described next. FIG. 9 is a flow chart showing the operation carried out by the third embodiment. In the flow chart in FIG. 9, processing from step S11 through step S16 is the same as the processing from the step S1 through the step S6 in the flow chart shown in FIG. 6. Therefore, explanation thereof is not repeated. In the step S16, the non-zero data NS are coded according to the second coding method and the coded data F1 in each subband are obtained. The coded data F1 are then input to the comparison means 12 and compared with the wavelet-transformed data WS (step S17). Whether or not the coded data F1 in each subband have a larger information amount than the wavelet-transformed data WS is judged (step S18). If the coded data F1 in each subband have a larger information amount than the wavelet-transformed data WS, the third coding means 13 carries out coding on the quantized data RS in the subband according to the third coding method and the coded data F2 are obtained (step S19). When the step S18 is denied, the coded data F1 are the final coded data F in the subband. For each subband, the processing from the step S17 to the step S19 is carried out and the coded data F1 or F2 in each subband are recorded as the final coded data F in a recording medium by the recording means 7 (step S20), and the processing ends.

As has been described above, in the third embodiment, the amount of information of the coded data F1 in a subband is compared with that of the wavelet transformed data WS. In the case where the information amount of the coded data F1 in the subband is larger than that of the wavelet-transformed data WS, the quantized data RS in the subband are coded according to the third coding method such as the Huffman coding. Therefore, the information amount of the coded data F obtained finally does not exceed the information amount of the wavelet-transformed data WS. In this manner, efficient coding of the original image data S can be carried out.

In order to decode the coded data F obtained in the third embodiment, processing which is a reversal of the flow chart shown in FIG. 9 is carried out. In other words, the coding method of the coded data F1 and F2 in each subband included in the coded data F is judged, and pairs of the non-zero data NS and the classification information B, as well as the quantized data RS are obtained by decoding the coded data F1 and F2 according to a decoding method corresponding to the coding method. For the pair of the classification information B and the non-zero data NS, the quantized data RS are obtained by finding the 0 data S0 based thereon. The quantized data RS are inversely quantized and the wavelet-transformed data WS are obtained. By carrying out inverse wavelet transform on the wavelet-transformed data WS, the original image data S are finally obtained.

Figure 10:
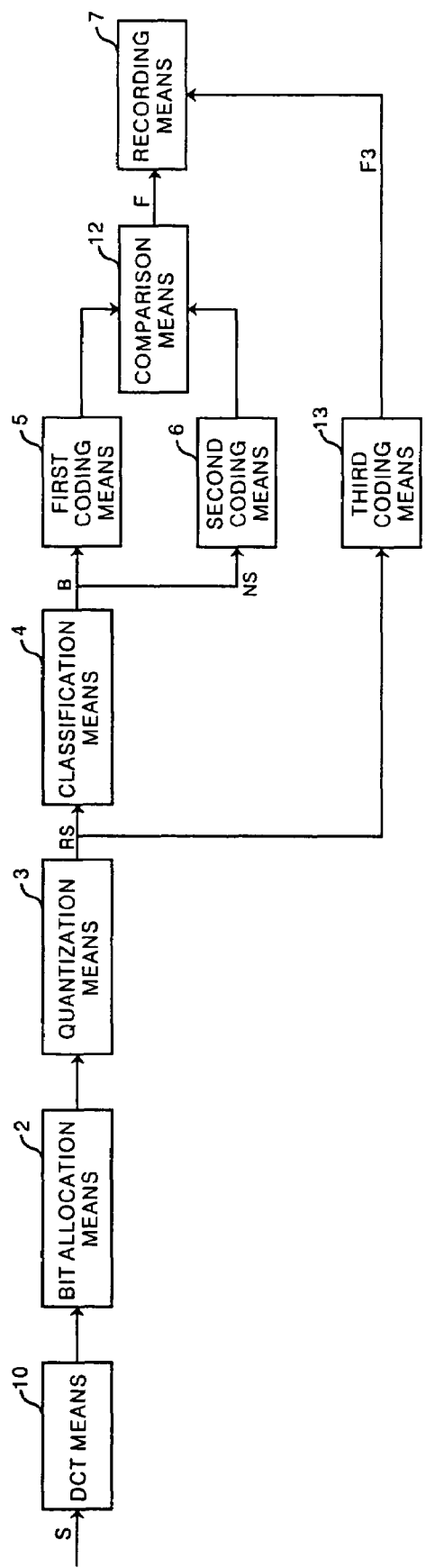
FIG. 10 is a schematic block diagram showing a configuration of a data compression apparatus according to a fourth embodiment of the present invention.
Figure 11:
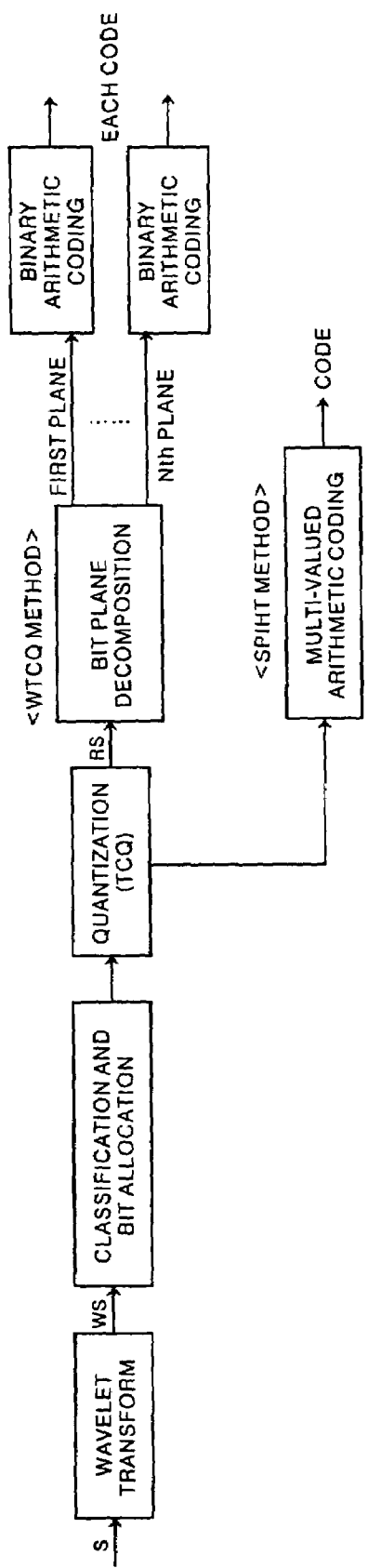
FIG. 11 is a schematic block diagram showing a configuration of a conventional data compression apparatus.
Figure 12:
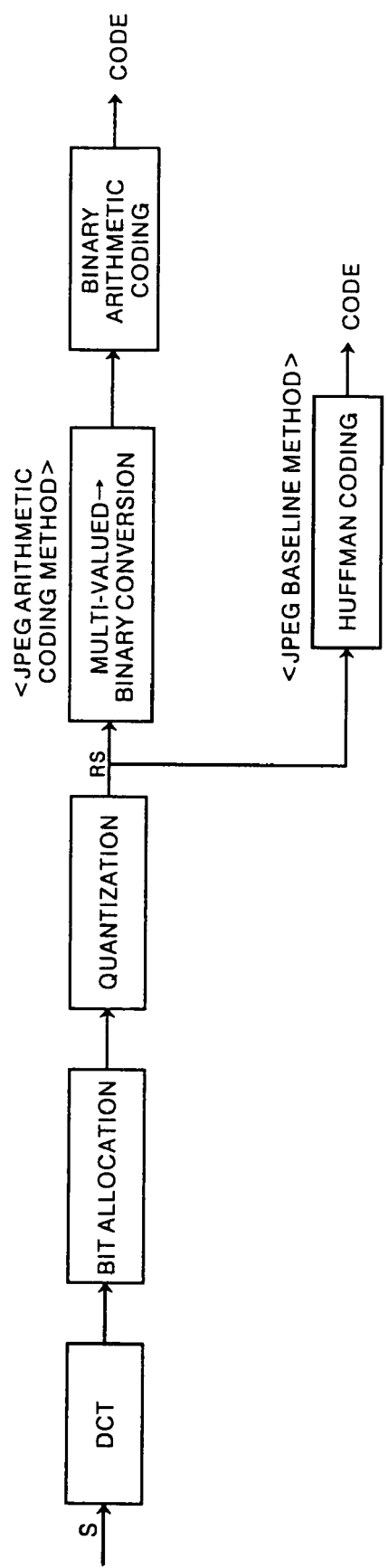
FIG. 12 is a schematic block diagram showing a configuration of another conventional data compression apparatus.

A fourth embodiment of the present invention will be explained next. FIG. 10 is a schematic block diagram showing a configuration of a data compression apparatus according to the fourth embodiment. The fourth embodiment differs from the third embodiment in the following points. First, the data compression apparatus comprises DCT means 10 for transforming the original image data S according to discrete cosine transform (DCT) method, not according to the wavelet transform method. Secondly, the data classification carried out in the case of the wavelet transform is not carried out. In the fourth embodiment, DCT, bit allocation, and quantization are a quantization method standardized according to the JPEG format, as in the second embodiment.

In the fourth embodiment, the information amount of the coded data F obtained by the second embodiment is compared with that of the original image data S, and when the former is larger than the latter, coded data F3 are obtained by carrying out coding on the quantized data RS by the third coding means 13 according to the third coding method. The coded data F3 are recorded as the final coded data F in a recording medium by the recording means 7.

As has been described above, in the method standardized according to the JPEG format, the information amount of the coded data F is compared with that of the original image data S, as in the third embodiment. When the coded data F have a larger information amount than the original image data S, the quantized data RS are coded according to the third coding method. In this manner, coding of the original image data S can be carried out fast and efficiently as in the third embodiment.

In the above embodiments, the quantized data RS are classified into the 0 data S0 and the non-zero data NS, using 0 as the representative value. However, the quantized data may be classified into 3 classes, namely the 0 data, data having values larger than 0 and smaller than a threshold value, and data having values equal to or larger than the threshold value. For the data having the values smaller than the threshold value, the same coding as in the above embodiments is carried out. For the data having the values equal to or larger than the threshold value, coding emphasizing efficiency is carried out thereon, since these values have a statistically small probability of appearance. As the representative value, 0 is not the only example, and an average of the quantized data RS may be used. In this case, classification may be carried out according to various classification rules, such as data having the average value and the other values, the average and values lower than the average and higher than the average, and data whose absolute differences from the average are smaller than a threshold value and equal to or larger than the threshold value.

Furthermore, in the above embodiments, image data have been coded according to the data compression method and apparatus of the present invention. However, various kinds of data such as audio data and animation data can be coded by the data compression method and apparatus of the present invention.

Moreover, in the third and fourth embodiments, the amount of information of the coded data F1 has been compared with that of the wavelet-transformed data WS or the original image data S. However, the amount of information of the coded data F1 may be compared with a predetermined threshold value which is smaller than the information amount of the wavelet-transformed data WS or the original image data S but enables reduction in the information amount when the quantized data RS are coded according to the third coding method.

What is claimed is:

1. A data compression method of obtaining compressed coded data by quantization of original data to obtain quantized data followed by coding and compression of the quantized data, the data compression method comprising the steps of:

classifying the quantized data into data having a value representing the quantized data and at least one set of classified data representing a data value other than the representative value while obtaining classification information data regarding the classification;

coding the classification information data according to a first coding method; and obtaining the coded data by coding at least the classified data according to a second coding method, out of the classified data and the data having the representative value.

2. A data compression method as claimed in claim 1, wherein the second coding method is different between the data having the representative value and each set of the classified data.

3. A data compression method as claimed in claim 1 or 2, wherein the quantized data are obtained by carrying out wavelet transform on the original data followed by quantization thereof.

4. A data compression method as claimed in claim 1 or 2, wherein the quantized data are obtained by carrying out DCT on the original data followed by quantization thereof.

5. A data compression method as claimed in claim 1, wherein the data having the representative value are 0 data representing the value 0 of the quantized data, and the classified data are non-zero data representing a non-zero value of the quantized data.

6. A data compression method as claimed in claim 1, wherein the first coding method is any one of Huffman coding, run length coding, B1 coding, B2 coding, Wyle coding, Golomb coding, Golomb-Rice coding, and binary arithmetic coding.

7. A data compression method as claimed in claim 1, wherein the second coding method is any one of Huffman coding, universal coding, and multi-valued arithmetic coding.

8. A data compression method as claimed in claim 1, wherein the coded data are obtained by coding the classified data according to a third coding method, out of the classification information data and/or the data having the representative value and the classified data, in the case where the amount of the coded data is larger than a predetermined information amount determined based on the original data.

9. A data compression method as claimed in claim 1, wherein a third coding method is any one of Huffman coding, arithmetic coding, and PCM coding.

10. The data compression method of claim 1, wherein said classification information data comprises a comparatively small information amount.

11. The data compression method of claim 10, wherein said classification information data comprises 3-valued data.

12. The data compression method of claim 10, wherein said classification information data comprises binary data.

13. A data compression apparatus for obtaining compressed coded data by quantization of original data to obtain quantized data followed by coding and compression of the quantized data, the data compression apparatus comprising:

classification means for classifying the quantized data into data having a representative value representing the quantized data and at least one set of classified data having a data value other than the representative value and for obtaining classification information data representing the classification;

first coding means for coding the classification information data by using a first coding method; and second coding means for coding at least the classified data out of the data having the representative value and the classified data, according to a second coding method.

14. A data compression apparatus as claimed in claim 13, wherein the second coding means carries out the second coding method which is different between the data having the representative value and each set of the classified data.

15. A data compression apparatus as claimed in claim 13 or 14, further comprising wavelet transform means for obtaining the quantized data by carrying out wavelet transform on the original data followed by quantization thereof.

16. A data compression apparatus as claimed in claim 13 or 14, further comprising DCT means for obtaining the quantized data by carrying out DCT on the original data followed by quantization thereof.

17. A data compression apparatus as claimed in claim 13, wherein the classification means classifies the quantized data by letting the data having the representative value be 0 data representing the value of 0 of the quantized data and letting the classified data be non-zero data representing a non-zero value of the quantized data.

18. A data compression apparatus as claimed in claim 13, further comprising:

judging means for judging whether or not the amount of the coded data is larger than a predetermined information amount determined based on the original data; and third coding means for obtaining the coded data by coding at least the classified data according to a third compression method, out of the classification information data and/or the data having the representative value and the classified data, in the case where the judging means has judged the amount of the coded data to be larger than the predetermined information amount.

19. The data compression apparatus of claim 13, wherein said classification information data comprises a comparatively small information amount.

20. The data compression apparatus of claim 19, wherein said classification information data comprises 3-valued data.

21. The data compression apparatus of claim 19, wherein said classification information data comprises binary data.

22. A computer-readable recording medium storing a program to cause a computer to execute a data compression method of obtaining compressed coded data by quantization of original data to obtain quantized data followed by coding and compression of the quantized data, the program comprising the procedures of:

classification of the quantized data into data having a value representing the quantized data and at least one set of classified data representing a data value other than the representative value, and acquisition of classification information data regarding the classification;

coding of the classification information data according to a first coding method; and coding of at least the classified data out of the classified data and the data having the representative value, according to a second coding method.

23. A computer-readable recording medium as claimed in claim 22, characterized by that the second coding method is different between the data having the representative value and each set of the classified data.

24. A computer-readable recording medium as claimed in claim 22 or 23, the program further comprising the procedure of obtaining the quantized data by carrying out wavelet transform on the original data followed by quantization thereof.

25. A computer-readable recording medium as claimed in claim 22 or 23, the program further comprising the procedure of obtaining the quantized data by carrying out DCT on the original data followed by quantization thereof.

26. A computer-readable recording medium as claimed in claim 22, wherein the procedure of classification is a procedure of classifying the quantized data by letting the data having the representative value be 0 data representing the value 0 of the quantized data, and by letting the classified data be non-zero data representing a non-zero value of the quantized data.

27. A computer-readable recording medium as claimed in claim 22, the program further including the procedures of:
 judgment as to whether or not the amount of the coded data is larger than a predetermined information amount determined based on the original data; and
 acquisition of the coded data by coding at least the classified data according to a third compression method out of the classification information data and/or the data having the representative value and the classified data, in the case where the amount of the coded data has been judged to be larger than the predetermined information amount.

28. The computer-readable recording medium of claim 22, wherein said classification information data comprises a comparatively small information amount.

29. The computer-readable recording medium of claim 28, wherein said classification information data comprises 3-valued data.

30. The computer-readable recording medium of claim 28, wherein said classification information data comprises binary data.

* * * * *